United States Patent [19]

Robbins, III

[11] Patent Number: 5,509,582
[45] Date of Patent: Apr. 23, 1996

[54] DISPENSING CAP WITH INTERNAL MEASURING CHAMBER

[76] Inventor: Edward S. Robbins, III, 2802 E. Avalon Ave., Muscle Shoals, Ala.

[21] Appl. No.: 288,896

[22] Filed: Aug. 10, 1994

Related U.S. Application Data

[63] Continuation of Ser. No. 47,086, Apr. 16, 1993, abandoned, which is a continuation-in-part of Ser. No. 237,336, May 3, 1994, which is a continuation of Ser. No. 979,042, Nov. 19, 1992, abandoned.

[51] Int. Cl.$^6$ ........................................ B67D 5/38
[52] U.S. Cl. .................... 222/158; 222/456; 222/480; 222/481
[58] Field of Search .................. 222/142.4, 142.5, 222/154, 156, 157, 158, 424.5, 425, 454, 456, 480, 481

[56] References Cited

U.S. PATENT DOCUMENTS

| | | | |
|---|---|---|---|
| 1,273,012 | 7/1918 | Souther | 222/456 |
| 1,714,368 | 5/1929 | Hobson | 222/553 X |
| 1,802,284 | 4/1931 | Stoddard | 222/572 X |
| 2,214,437 | 9/1940 | Punte et al. | 206/42 |
| 2,339,425 | 1/1944 | Lucas | 222/425 |
| 2,370,820 | 3/1945 | Stott | 222/456 |
| 2,449,285 | 9/1948 | Ekstrom | 222/548 |
| 2,784,884 | 3/1957 | Borie, Jr. | 222/336 |
| 2,804,103 | 8/1957 | Wall | 141/381 |
| 2,811,281 | 10/1957 | Donovan | 222/81 |
| 2,840,124 | 6/1958 | Greene | 141/381 |
| 2,844,266 | 7/1958 | Hofe | 215/64 |
| 3,020,659 | 2/1962 | Paulini | 40/307 |
| 3,033,420 | 5/1962 | Thomas et al. | 222/456 X |
| 3,140,799 | 7/1964 | Mehr | 222/131 |
| 3,424,355 | 1/1969 | Blumen | 222/450 |
| 3,486,665 | 12/1969 | La Croce | 222/480 |
| 3,860,111 | 1/1975 | Thompson | 206/534 |
| 3,948,105 | 4/1976 | Johnson, Jr. | 73/427 |
| 4,069,935 | 1/1978 | Hampel | 215/203 |
| 4,083,467 | 4/1978 | Mullins et al. | 220/90.4 |
| 4,144,989 | 3/1979 | Joy | 220/438 |
| 4,164,301 | 8/1979 | Thayer | 220/253 |
| 4,209,100 | 6/1980 | Ohlig | 222/480 X |
| 4,292,846 | 10/1981 | Barnett | 73/427 |
| 4,346,823 | 8/1982 | Eppenbach | 222/456 X |
| 4,376,497 | 3/1983 | Mumford | 222/153 |
| 4,399,928 | 8/1983 | Klingler | 220/335 |
| 4,544,063 | 10/1985 | Neward | 206/540 |
| 4,580,687 | 4/1986 | Lewis | 215/237 |
| 4,606,481 | 8/1986 | Conti et al. | 222/562 |
| 4,610,371 | 9/1986 | Karkiewicz | 220/266 |
| 4,613,057 | 9/1986 | Sacchetti et al. | 221/265 |
| 4,635,828 | 1/1987 | Kaufman | 222/185 |
| 4,643,881 | 2/1987 | Alexander et al. | 422/265 |
| 4,646,948 | 3/1987 | Jennings | 222/454 |
| 4,691,821 | 8/1987 | Hofmann | 206/216 |
| 4,693,399 | 9/1987 | Hickman et al. | 222/480 |
| 4,714,181 | 12/1987 | Kozlowski et al. | 222/480 |

(List continued on next page.)

Primary Examiner—Andres Kashnikow
Assistant Examiner—Joseph A. Kaufman
Attorney, Agent, or Firm—Nixon & Vanderhye

[57] ABSTRACT

A measuring/dispensing cap is adapted for attachment to an open, upper end of a conventional container. The cap includes a top and a peripheral skirt extending downwardly from the top, and a partition separates the peripheral skirt into upper and lower sections, the upper section constituting a measuring chamber defined by the top, the upper section of the skirt and the partition. At least one of the top and upper section of the peripheral skirt is provided with volume indicators. The partition is formed with a weir aperture on one side of a diametrical centerline extending across the partition, the aperture defined in part by a weir edge extending parallel to and spaced from the centerline. At least one dispensing door is secured to the top by an integral hinge having an axis parallel to the centerline and the weir edge, such that a portion of the door opposite the hinge lies on the other side of the diametrical centerline. This arrangement allows measured amounts of container contents to be dispensed from the measuring chamber without concern that additional amounts will be transferred from the container into the chamber.

23 Claims, 7 Drawing Sheets

U.S. PATENT DOCUMENTS

| | | | |
|---|---|---|---|
| 4,723,693 | 2/1988 | DeCoster | 222/480 X |
| 4,802,597 | 2/1989 | Dubach | 215/307 |
| 4,898,292 | 2/1990 | VerWeyst et al. | 215/237 |
| 4,930,688 | 6/1990 | Arona-Delonghi | 222/484 |
| 4,936,494 | 6/1990 | Weidman | 222/480 |
| 4,955,513 | 9/1990 | Bennett | 222/480 |
| 4,961,521 | 10/1990 | Eckman | 222/142.5 |
| 5,011,048 | 4/1991 | Mark | 222/455 |
| 5,064,106 | 11/1991 | Butler et al. | 222/456 |
| 5,085,331 | 2/1992 | Groya et al. | 215/245 |
| 5,139,181 | 8/1992 | VerWeyst | 222/480 |

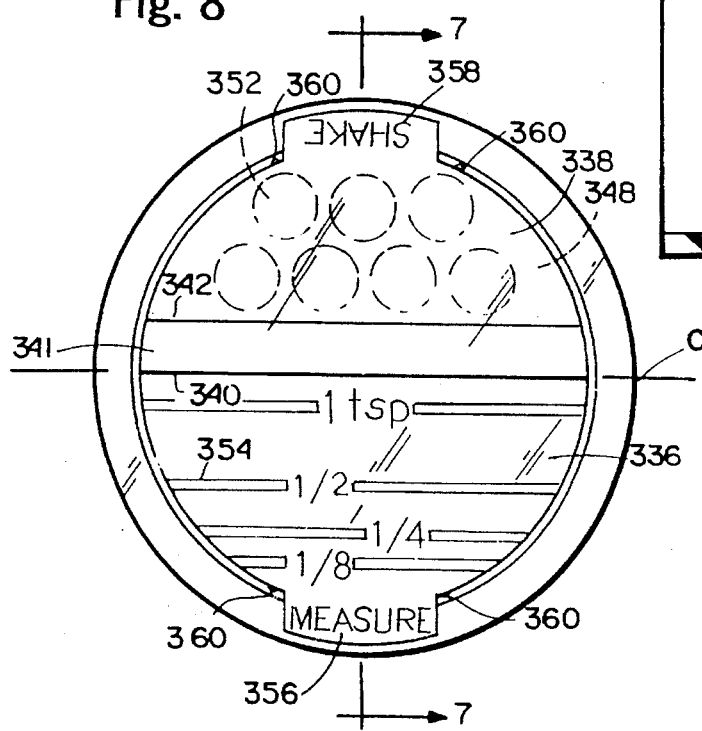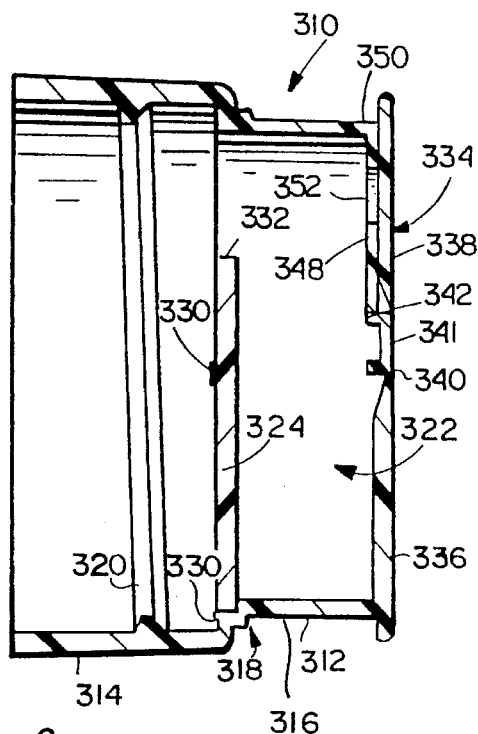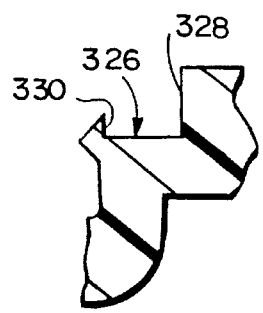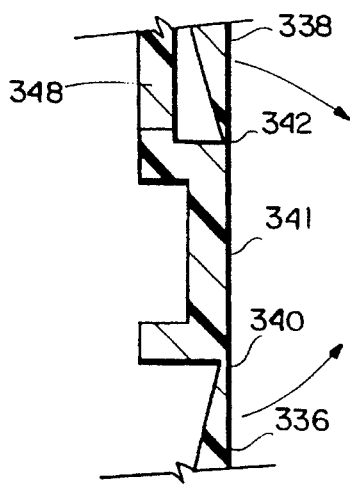

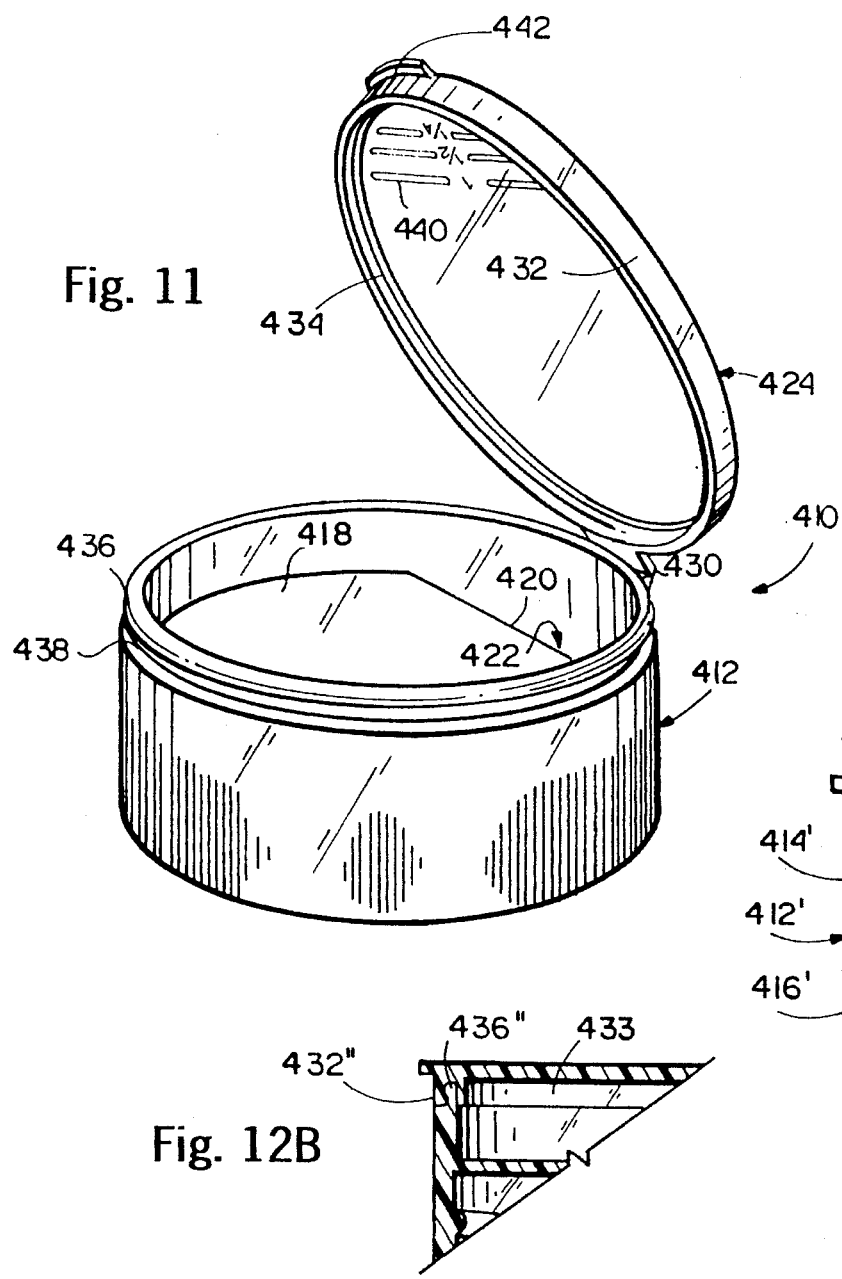
Fig. 11
Fig. 12A
Fig. 12B
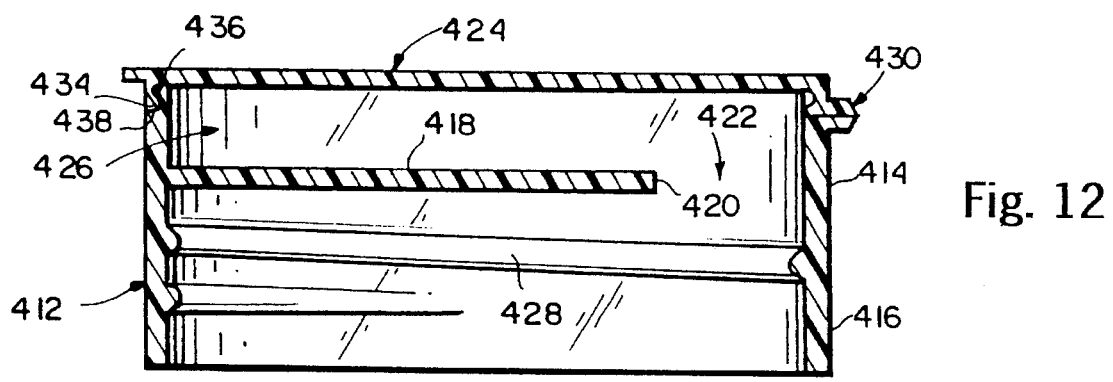
Fig. 12

5,509,582

DISPENSING CAP WITH INTERNAL MEASURING CHAMBER

This application is a continuation of commonly owned application Ser. No. 08/047,086 filed Apr. 16, 1993, now abandoned, and which in turn, is a continuation-in-part of commonly owned application Ser. No. 08/237,336 filed May 3, 1994, now allowed, which is a File Wrapper Continuation Application of Ser. No. 07/979,042 filed Nov. 19, 1992, now abandoned.

BACKGROUND AND SUMMARY OF THE INVENTION

The present invention relates generally to dispensing containers and, more specifically, to dispensing cap constructions enabling accurately measured amounts of the container contents to be dispensed from the cap.

Dispensing containers are, of course, well known and are used in many difference industries for many different purposes. One such use is in the food industry, and a specific example includes jars and other similar containers which contain solid foods (such as spices) in particulate, granular or powder-like form. Typically, a measuring spoon or separate measuring cup is utilized in conjunction with the jar or container when accurate amounts are to be obtained.

The present invention eliminates the need for measuring spoons for cups by providing a hollow cap, which serves as its own measuring device, for use with an otherwise conventional container. While the incorporation of a measuring function into a container/cap construction for the discharge of desired amounts of the container contents is not new (see for example, U.S. Pat. Nos. 1,802,284; 2,804,103; 3,860,111; 4,613,057 and 4,635,828), the present invention provides improved and simplified structures for accomplishing this result, while generally retaining the desirable option of substantially unrestricted pouring and/or shaking of the container contents from the dispenser cap.

In one exemplary embodiment of the invention, a transparent plastic cap is provided which includes a top and a depending skirt. The skirt is divided into upper and lower portions by an internal partition or weir panel provided with a weir aperture lying one one side of a centerline extending across the cap. The weir panel, in combination with the skirt wall and the top, combine to form a measuring chamber into which a desired amount of container contents may be poured via the weir aperture. The top of the cap is formed with a pair of dispensing doors located on either side of the cap centerline and integrally hinged along parallel hinge lines to a bridge or connector strip through which the cap centerline passes. That door which lies on the opposite side of the cap centerline from the weir aperture, is provided with volume gradations in the form of level lines and suitable alpha and/or numeric characters, and is used to dispense the measured amounts of contents from the cap. The opposite or second door, overlying the weir aperture, is used in an alternative mode of operation where it is desired to pour the container contents directly without concern for specific amounts.

In another embodiment, the top of the cap is formed as a separable transparent piece, which may be snap-fit onto an upper annular rim of a transparent or opaque cap skirt.

In still another embodiment, a disc is located axially between a separable, transparent top piece and the cap skirt, with the disc having a pair of openings conforming to the shape of, and underlying the dispensing doors. One of the apertures in this intermediate disc is fitted with a panel provided with a plurality of openings. These shaker or sprinkler openings are used in the flow through mode where accurately measured amounts are not of concern.

In another embodiment, the panel with the plurality of openings utilized in the flow through mode is made integral with the cap top and the cap skirt.

In another exemplary embodiment, the dispenser cap includes a single door formed essentially by the entire top of the cap. The manner of which measured amounts of container contents are dispensed from the cap is similar to the other disclosed embodiments.

In still another embodiment, the weir panel is inclined from the weir edge to an upper rim of the skirt, so that when the cap door is opened, the container contents will flow more easily out of the measuring chamber.

With respect to all of the disclosed embodiments, various generally interchangeable arrangements are provided as between the cap top, dispensing doors and skirt.

Thus, in a broad aspect, the present invention relates to a measuring/dispensing cap adapted for attachment to an open, upper edge of a container, the cap comparing first means for enabling an accurately determined amount of contents to be dispensed from the container, and second means for enabling substantially unrestricted pouring of contents from the container.

In another aspect, the invention relates to a measuring/dispensing cap adapted for attachment to an open, upper end of a container, the cap comprising a top and a peripheral skirt extending downwardly from the top; a partition separating the peripheral skirt into upper and lower sections, the upper section comparing a measuring chamber defined by the top, the upper section of the skirt and the partition, and wherein at least one of the top and upper section of the peripheral skirt is provided with volume indicators; the partition formed with a weir aperture on one side of a diametrical centerline extending across the partition, the aperture defined in part by a weir edge extending parallel to and spaced from the centerline; and at least one dispensing door secured to the top by an integral hinge having an axis parallel to the centerline and the weir edge, and wherein a portion of the door opposite the hinge lies on the other side of the diametrical centerline.

Other objects and advantages of the invention will become apparent from the detailed description which follows.

BRIEF DESCRIPTION OF THE DRAWINGS

FIG. 7 is a cross sectional view of a dispensing cap in accordance with a fourth exemplary embodiment of the invention, taken along the line 7—7 of FIG. 8;

FIG. 8 is an end view of the dispensing cap illustrated in FIG. 7;

FIGS. 9 and 10 are enlarged details of the dispensing cap illustrated in FIGS. 7 and 8;

FIG. 11 is a perspective view of a dispensing cap in accordance with a fifth exemplary embodiment of the invention;

FIG. 12 is a cross section through a dispensing cap of the type disclosed in FIG. 11, but with the cap door in a closed position;

FIGS. 12A and 12B disclose alternative closure arrangements for the cap door illustrated in FIGS. 11 and 12.

DETAILED DESCRIPTION OF THE DRAWINGS

Figure 1:
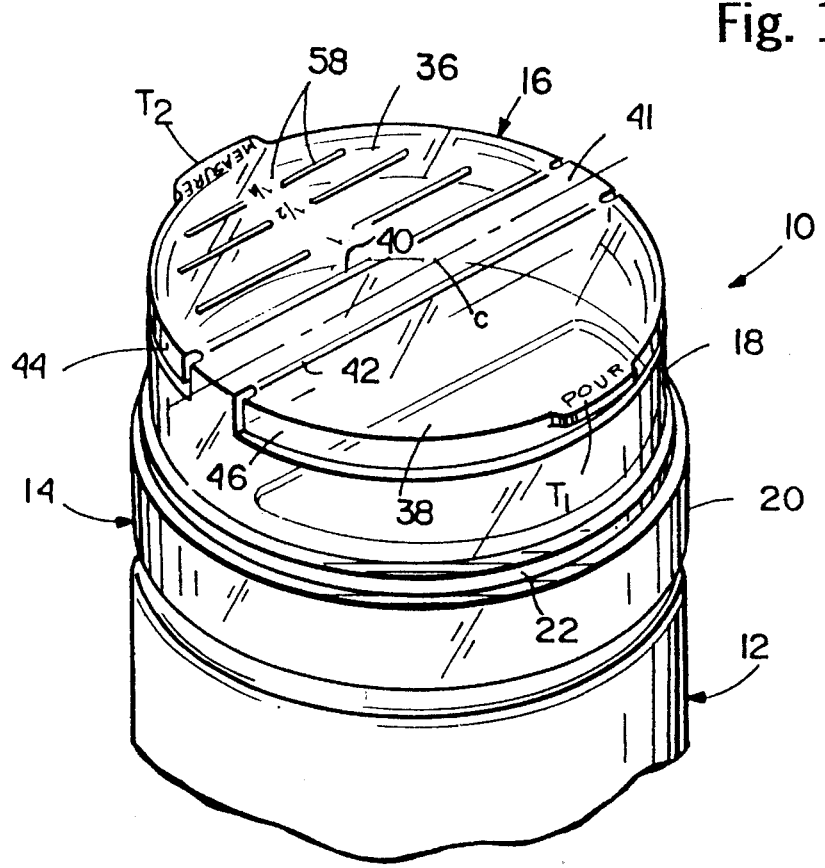
FIG. 1 is a perspective view of a dispensing cap and container in accordance with a first exemplary embodiment of the invention.
Figure 2:
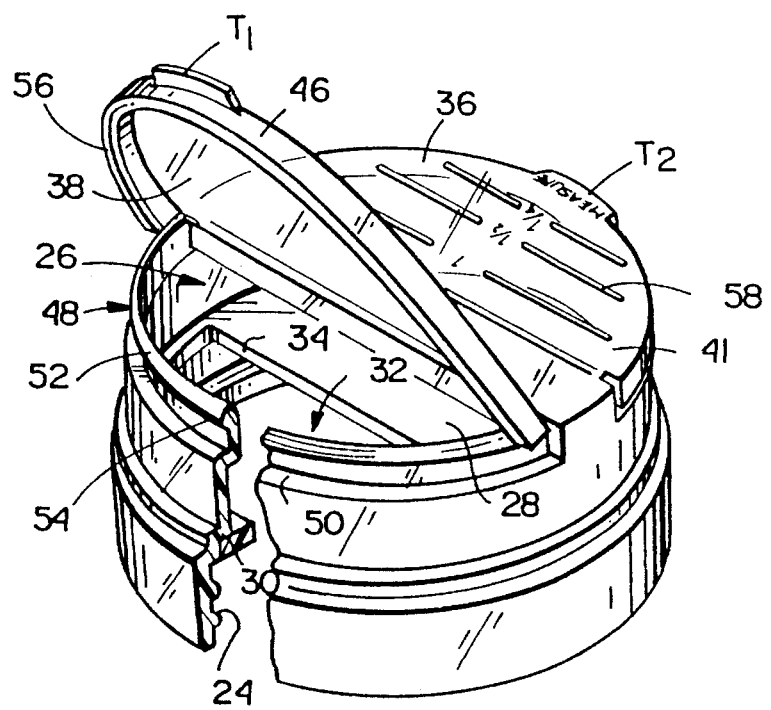
FIG. 2 is a perspective view of a cap illustrated in FIG. 1, but with a dispensing door shown in an open position.

With reference now to FIGS. 1 and 2, a jar or container 10, which may be of conventional jar-like construction, includes a peripheral side wall 12 extending upwardly from a bottom wall (not shown), terminating in an externally threaded upper open end. The upstanding threaded portion typically receives a conventional closure which, as described below, is replaced by the unique dispenser cap 14 in accordance with this invention.

The jar or container 10, may include powdered or granular contents which may be any of a variety of substances characterized broadly as spices, but it should be understood that the jar and dispensing cap constructions in accordance with this invention are equally suitable for use with other powder and/or granulated materials which are to be dispensed in measured quantities, such as dietary powders, coffee, drink concentrates, medicinal powders, detergents and the like. With the incorporation of suitable seals, the dispensing cap of this invention may also be used to dispense liquid contents in similarly measured amounts.

The measuring/dispensing cap 14 as shown in FIGS. 1 and 2 is preferably made of a transparent plastic material, and includes a top or cover 16 and a depending skirt portion which is divided into upper and lower sections 18, 20, respectively, by an annular double-stepped shoulder 22. The lower skirt portion 20 is provided with internal screw threads 24 adapted to cooperate with the external threads on the upstanding dispensing portion of the jar 10 in the manner of a typical threaded closure.

The upper portion 20 of the cap defines a volumetric space or chamber 26 from which measured amounts of contents can be dispensed as described in greater detail below. The volumetric space or measuring chamber 26 is defined by the upper skirt section 18, the top 16 and a weir panel 28 which may be inserted into the cap from the lower threaded end thereof, and into flush, frictional engagement with an interior annular shoulder 30 (radially adjacent the annular exterior shoulder 22). The panel 28 may be held in place by a simple friction fit, or a lip may be provided opposite the shoulder 30 to create a snap-in groove for receiving the panel. Panel 28 is formed with an aperture 32 which has a chordal shape, and which is partially defined by a weir edge 34. Edge 34 lies to the aperture side of a diametrical centerline C (FIG. 1) extending across the cap, i.e., the aperture lies wholly on one side of the centerline, and the edge 34 is spaced from that centerline, thereby enabling the weir panel to effectively perform a dam function as described in greater detail below.

The top 16 incorporates a pair of flip open dispensing doors 36, 38 integrally hinged to the top wall 16 along parallel hinge lines 40, 42 lying symmetrically on either side of the cap diametrical centerline. Each of the doors has a partially circular shape, each extending partially about the periphery of the cap and hinged or chord, as noted above, along the parallel hinge lines 40, 42 which together define a bridge strip 41.

In this first embodiment, each door 36, 38 has a peripheral, depending flange 44, 46, respectively, and since these doors are identical (with minor noted exceptions), only the door 38 will be described in detail. The flange 46 is frictionally engageable with a peripheral edge or rim 48 at the upper end of the section 18 of the cap skirt. The rim 48 is formed by a radially inward shoulder 50 and an upstanding free edge 52. As a result of this configuration, the door flange 46 fits flush with the upper skirt portion 18 when closed. The upstanding edge 52 in this embodiment is formed with a radially outwardly projection bead 54, over which a radial inward bear 56 of the flange 46 snaps to releasably hold the door 38 in the closed position. An integral tab $T_1$ extends radially outwardly from the flange 46 and facilitates opening of the door 38.

Level of volume indicates 58 (for example ½ oz., 1 oz., 1½ oz., etc.) are provided on the door 36 in the form of lines (parallel to the centerline C) and suitable alpha and/or numeric legends and may, if desired, be extended to run axially down the upper skirt portion 18 to the shoulder 22. The manner in which the doors 36, 38 are used is described in greater detail below.

The measuring/dispensing cap 14 will be assembled initially so that the door 38 and aperture 32 are in overlying relationship as seen in FIGS. 1 and 2. It follows, then, that door 36 is diametrically opposed to the panel aperture 32. With the cap in place on the container 10, and with doors 36 and 38 in the closed position, the user may tilt the container 10 in such a way (i.e., door 36 below door 38) that contents will spill over the weir edge 34 through aperture 32 and into the volumetric space or measuring chamber 26. When the container is so tilted, the user may easily determine the volume of contents transferred to the space 26 with the assistance of the level indicators 58. When the desired amount of contents have been transferred to the chamber 26, the door 36 may be flipped opened (door 38 remaining closed) with the aid of tab $T_2$, and the contents poured out of the cap. Because of the diametrically opposed relationship between the panel aperture 32 and the door 36, the contents within the chamber 26 may be poured out of the cap through the door 36, without additional contents spilling over the weir edge 34. In other words, the weir panel 28 (in this tilted orientation) acts as a dam, the height of which (as defined by weir edge 34) is sufficient to block unwanted flow of material into chamber 26 as the already measured amount is discharged through the door 36. The reason for this is simply that the degree of tilt required to discharge the measured amount out of the cap via door 38 is less than the degree of tilt required to cause the contents to spill over the weir edge 34 and into the chamber 26.

In an alternative mode of operation, the container may be re-oriented (with door 38 below door 36), and the container contents poured straight through the panel aperture 32 and door 38 (door 36 remaining closed), when dispensing accuracy is not a concern.

It will further be appreciated that weir panel 28 may be formed with smaller or larger apertures, so long as the weir edge 34 is retained on that side of the centerline C remote from door 36.

As a further convenience to the user, tabs $T_1$ and $T_2$ may be printed (or engraved) with the words "POUR" and "MEASURE", respectively.

Figure 3:
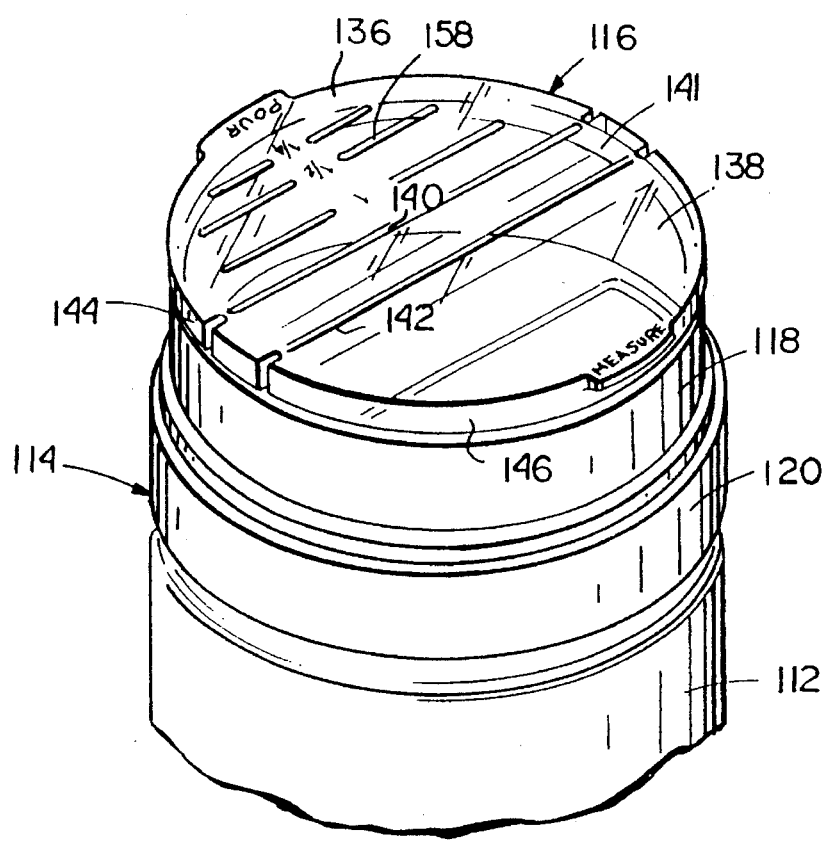
FIG. 3 is a perspective view of a dispensing cap in accordance with a second exemplary embodiment of the invention.
Figure 4:
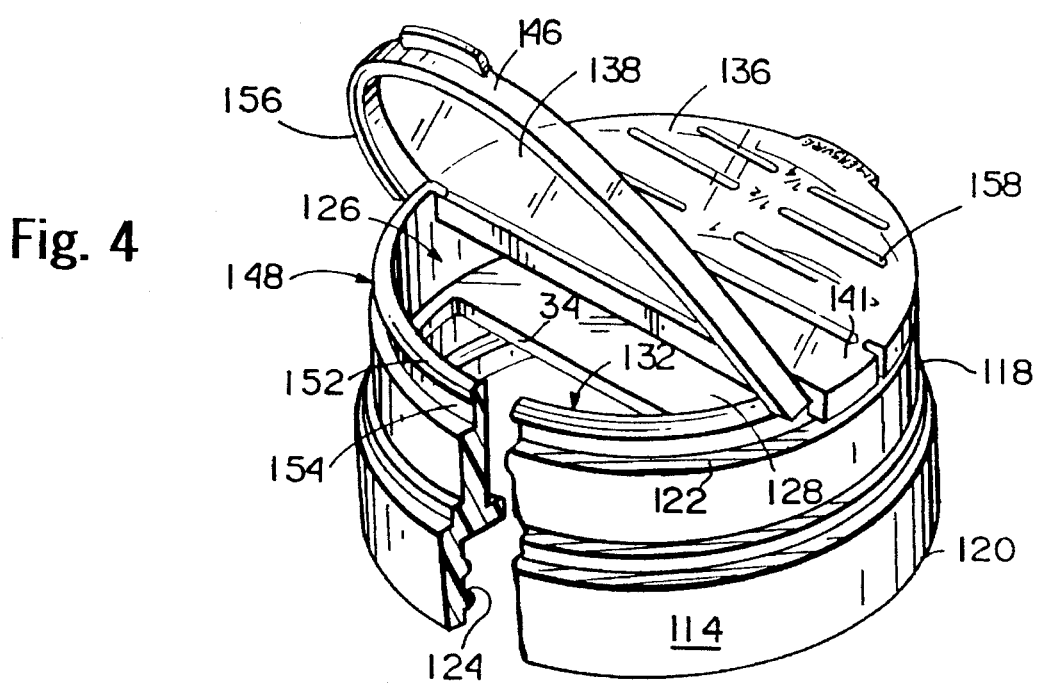
FIG. 4 is a perspective view of the dispensing cap shown in FIG. 3, but with one of the dispensing doors shown in the open position.

Turning now to FIGS. 3 and 4, a second exemplary embodiment of the invention is illustrated wherein reference numerals similar to those used in FIGS. 1 and 2 are employed, but with the prefix "1" added. This second exemplary embodiment of the invention differs from the first described embodiment in that the top 116, including doors 136, 138 is formed as a separate piece that can be snapped into place over the rim 148 of the upper skirt section 118. More specifically, the upper rim 148 of the skirt has been continued around the entire periphery of the skirt, and the connecting or bridge strip 141 has an interior configuration identical to the door flanges 144, 146, thereby enabling the entirety of the top 116 to be snapped into place on the rim 148. Following attachment of the top wall 116, it may be permanently secured in place by heat streaking, ultrasonic welding, interlocking key or other suitable means, preferably at diametrically opposed locations on either side of the bridge strip 141.

Because of the removable nature of top 116, the weir panel 128 may be formed integrally with the cap skirt portions 118, 120. Moreover, it is not possible to have the top wall 116 transparent and the remainder of the cap opaque, thereby permitting additional flexibility in the creative packaging aspects of the cap. Otherwise, the construction and manner of use of the cap remains substantially as described above in connection with the first embodiment.

Figure 5:
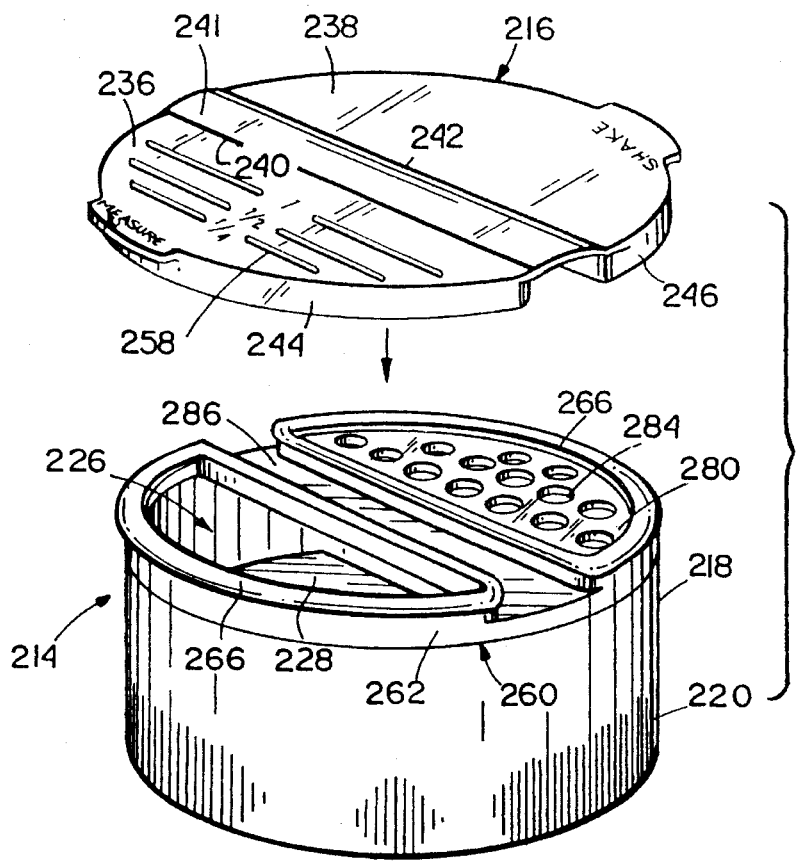
FIG. 5 is an exploded view of a dispensing cap in accordance with a third exemplary embodiment of the invention.
Figure 6:
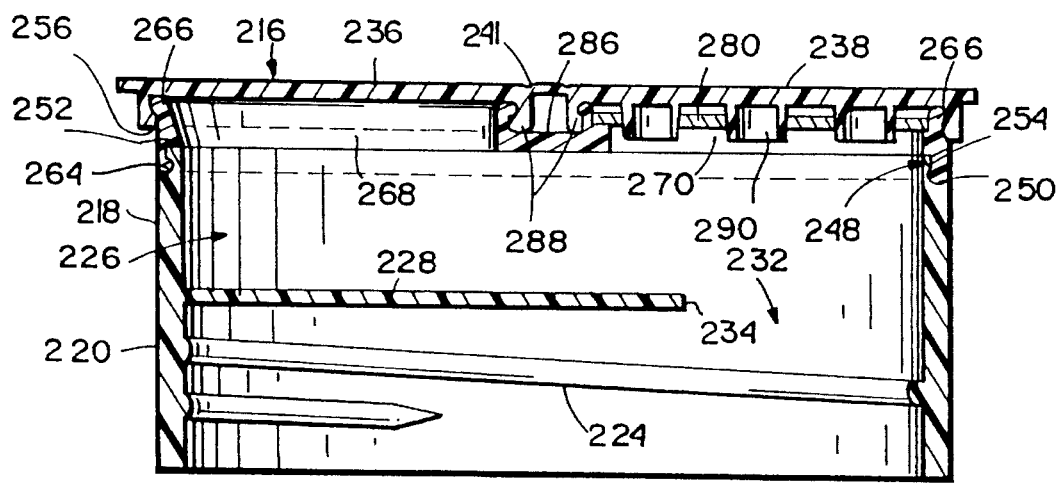
FIG. 6 is a cross sectional view of a dispensing cap of the type shown in FIG. 5.
Figure 6A:
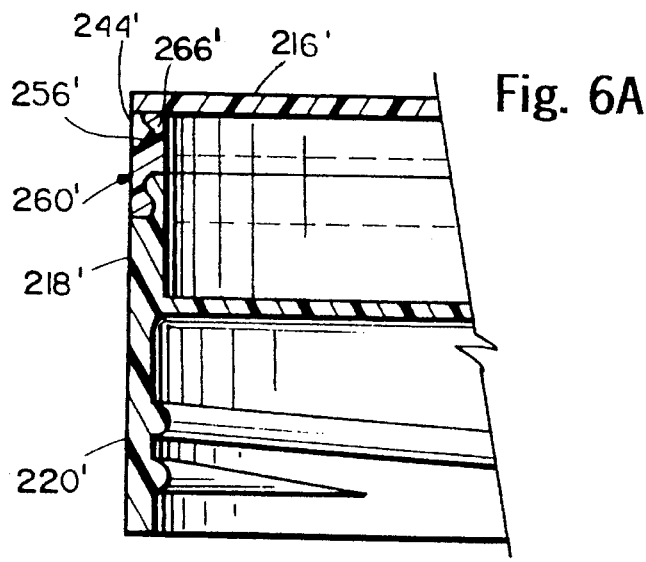
FIGS. 6A through 6C disclose alternative closure arrangements for the cap doors of the cap shown in FIGS. 5 and 6.
Figure 6B:
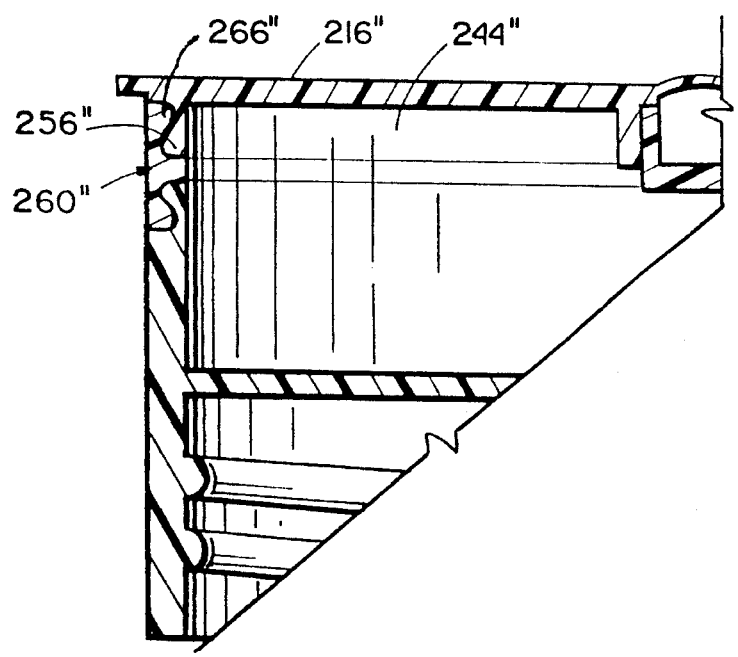
Figure 6C:
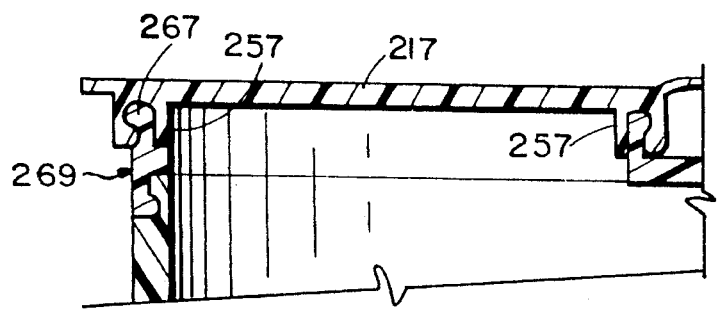

Turning now to FIGS. 5 thru 6C, a "double top" configuration is illustrated wherein the top of the cap is formed as two snap-on, disc-like members. For the sake of convenience and understanding, similar reference numerals as sued in the previously described embodiments are employed in FIGS. 5 thru 6C where appropriate, but with the prefix "2" added. More specifically, the cap 214 has an open-ended skirt with upper portion 218 and lower portion 220 (flush on their outer surfaces), separated internally by an integral partition or weir panel 228, (creating the volumetric space or measuring chamber 226) having an aperture 232 and a weir edge 234. In this third embodiment, top 216 is formed with dispensing doors 236, 238 which are similar to doors 136, 138 in that they are integrally hinged along parallel hinge lines 240, 242 on either side of a connector or bridge strip 241. In additional, the doors have peripheral flanges 244, 246 which are similar to rims 144, 146.

The upper end of skirt section 218 is provided with an upper rim 248 (FIG. 6) including a radial inward shoulder 250 and an upstanding free edge 252 formed with a radial outwardly bead 254.

A significant structural difference in this third embodiment relates to the incorporation of an intermediate disk or plate 260 axially between the skirt section 218 and the top or cover 216. This intermediate disc is formed with a peripheral rim 262, the lower edge of which is provided with a radially inward bead 264, enabling the disc 260 to be snap fit over the edge 252 and bead 254 and into seated engagement on the shoulder 250.

The upper edge of the peripheral rim 262 is formed with beads 266 which "outline" a pair of chord-shaped apertures 268, 270, enabling the top or cover 216, and specifically the radially inward bead 256 to be snap fit over the beads 266 as best seen in FIG. 6. The openings 268, 270 substantially underlie the similarly shaped doors 236, 238, respectively. The aperture 268 allows unrestricted pouring of contents from the container, as described further below. The aperture 278, on the other hand, receives a panel 280 which can be friction fit or snap fit into seated engagement with a shoulder 282 extending about the periphery of the aperture. Panel 280 is formed with a plurality of openings 284, the exact size and quantity of which can vary depending on the consistency, granule size, etc. of the contents to be dispensed.

The disc or plate 280 also includes a diametrical connector or bridge strip 286 extending between the apertures 268, 270 and adapted to underlie the bridge strip 241 on the top 216. As best seen in FIGS. 5 and 6, the beads 266 surrounding apertures 268, 270 create undercuts or grooves which are adapted to receive beads 288 located at free edges of corresponding straight portions of flanges 244, 246 (underlying the hinge lines 240, 242) of the cap 216.

With continued reference to FIGS. 5 and 6, it will be appreciated that the top or cover 216 is attached to the disc or plate 260 so that door 236 with volume indicators 258 overlies the opening 286 which, in turn, is located diametrically opposite the weir opening 232 as defined by edge 234. As a result, the user may pour contents over the edge 234 into the chamber 226 until the desired volume is transferred to the chamber 226. The container may then be reoriented and tilted with the door 236 opened to dispense the accurately measured volume. The weir panel 228 prevents additional contents from being dispensed with the measured amount, in the same manner as described hereinabove.

Alternatively, the door 236 closed, the container may be reoriented and door 238 may be opened, so that contents can be shaken directly through the weir opening 232, the openings 284 in disc panel 280, and the door 238.

Another feature of this embodiment of the invention is the optional inclusion of plugs 290 on the lower surface of door 238, each adapted to plug or close a corresponding opening 284 in the removable panel 280. In this way, the openings 284 are prevented from being clogged with container contents and are, in fact, wiped clean each time the door 238 is closed.

FIG. 6A illustrates a minor variation in the disc 260' in the sense that the cross sectional profile of disc 260' has been adjusted so that the flange 244' of the top 216' lies flush with the rim 262' and skirt sections 218' and 220'. FIG. 6B illustrates another alternative arrangement where the bear arrangement on the top or cover 216" and the intermediate disc 260" is reversed. In other words, bead 256" on the rim 244" is a radially outward bead received inside the intermediate disc or plate, while the bead 266" on the disc or plate 260' is a radially inward bead. Thus, the top or cover 216" fits inside the disc 260" (and inside the apertures corresponding to 268, 270).

FIG. 6C illustrates yet another alternative which is similar to FIG. 6 except that an internal skirt 257 has been added to engage inside the disc 269 so that the top 217 has a flange arrangement which straddles the beads 267 (one shown) on the disc 269. This arrangement provides a substantially airtight seal about both apertures in the disc (corresponding to apertures 268, 270).

Turning now to FIGS. 7 through 10, another embodiment of the invention is disclosed wherein the sprinkling openings are made integral with the cap. More specifically, the cap 310 includes a skirt 312 which is divided into skirt portions 314, 316, lower and upper about an external double step shoulder 318. The lower skirt portion 314 is provided with an internal screw thread 320 for attaching the cap to a container. The upper skirt portion 316 forms a volumetric measuring chamber 322 which is also defined by the chord-shaped weir panel 324 which seats in a groove 326 as defined by a shoulder 328 and a plurality of projections 330 (preferably three in number — two are shown in FIG. 7), best seen in FIG. 10. It will be appreciated that the panel 324 may also be molded integrally with the cap. Weir panel 324 also includes a weir edge 332, over which container contents are spilled into the measuring chamber 322.

The top or cover 334 of the cap is formed with integral doors 336 and 338 on either side of a connector or bridge strip 341, as defined by parallel hinge edges 340, 342. Edge 340 lies on the diametric centerline C of the cap while hinge line 342 lies on the same side of the centerline C as weir edge 332. The thinned areas of the top which form the hinge lines 340 and 342 are shown in detail in FIG. 9.

Underlying the door 338, there is an integral chord-shaped sprinkler or shaker panel 348 which extends between the strip 340 and the peripheral wall of the cap, at the uppermost edge 350 of skirt portion 314. The shaker panel 348 is provided with a plurality of sprinkling holes 352 which permit direct sprinkling of contents from the container, through holes 352 and through the door 338. At the same time, in an alternative mode of operation, contents may be spilled over the weir edge 332 into chamber 322 until a desired amount is transferred to the chamber, as indicated by volumetric gradations 354 on the door 336. Door 338 may then be opened and the measured volume of contents poured form the chamber 322 and through the door 336, with weir panel 324 preventing additional container contents from spilling into the chamber 322.

Diametrically oppositely located tabs 356 and 358 facilitate opening of their respective doors 336, 338. In this instance, the doors 336, 338 fully nest within the open end of the skirt portion, while tabs 356, 358 lie within notches formed in the skirt rim. As best seen in FIG. 8, bumps or nubs 360 may be formed on the peripheral surfaces of the doors 336, 338, on opposite sides of the tabs 358, 368 for snap-in engagement with complimentary recesses formed on the inside surface of the cap skirt portion 312. While the bumps or numbs 360 hold the doors in a closed position, the tabs 356, 358 also serve to prevent over closing of the doors.

With reference now to FIGS. 11 through 12B, yet another embodiment of the invention is disclosed. Here, a transparent cap 410 includes a skirt 412 divided internally into upper and lower portions 414, 416 by an integral, chord-shaped weir panel 418. The panel 418 is formed with a weir edge 420 defining, in cooperation with part of the skirt wall, a chord-shaped weir opening 422. The upper portion 414 of the skirt in cooperation with weir panel 418 and the top or cover 424 define a volumetric measuring chamber 426 similar to those described in previous embodiments. The internal surface of the lower skirt portion 416 is formed with a screw thread 428 for attaching the cap to a container in the usual manner.

The top or cover 424 in this embodiment is provided as a single dispensing door, secured to the skirt 412 by an integral hinge 430. The top or cover 424 is formed with peripheral rim 432 provided on its interior surface with a radial inward bead 434 which is designed to snap over a radial outwardly bead 436 at the upper edge of the skirt 412 and to seat on the shoulder 438. The cover or top 424 is provided with volume gradations 440 which may, if desired, continue along adjacent portions of the skirt section 414. A radial tab 442 facilitates opening of the cap for dispensing a measured amount of contents from the chamber 426. In this regard, it will be appreciated that the top or cover must open from the side opposed to the weir opening 422 in order to function properly. Stated otherwise, the hinge 430 must be located on the same side of the cap as the weir opening 422.

FIGS. 12A and 12B illustrate alternative closing arrangements. In FIGS. 12A, the rim 432' of the top or cover 424' fits inside the skirt rim (similar to FIG. 6B) and, in FIG. 12B, an inside/outside arrangement is illustrated (similar to FIG. 6C). More specifically, an internal flange 433 is used in conjunction with rim 432" to thereby straddle the annular bead 436" on the upper edge of the skirt.

Figure 13:
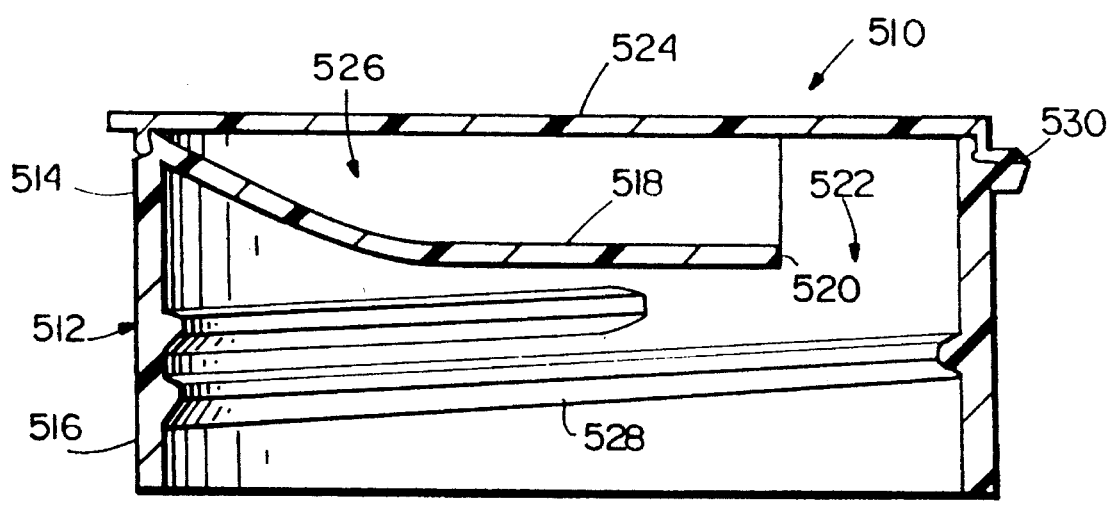
FIG. 13 is a cross section of a dispensing cap in accordance with a sixth exemplary embodiment of the invention.

Now turning to FIG. 13, a cap 510 is illustrated which is similar in all respects to the cap illustrated in FIGS. 11 and 12 (similar reference numerals are used but with the prefix "5") with the exception that weir panel 518 slopes form the weir opening 522 upwardly to the upper edge of the upper skirt section 514. This arrangement allows the measured contents within measuring chamber 526 to flow more easily out of the cap when the top or cover 524 is opened. Here again, as with all of the disclosed embodiments, the doors may use outside, inside or straddle connections with the skirt.

It will be appreciated that the above described cap constructions provide cost effective designs which are easily to use and easy to manufacture, and which enable dispensing of precisely measuring amounts from a container, thereby eliminating the need for separate measuring devices such as cups and spoons.

While the invention has bene described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A measuring/dispensing cap adapted for attachment to an open upper end of a container the cap comprising:

a substantially horizontal top and a peripheral skirt extending downwardly from said top, said skirt having means for removably attaching the cap to the container; a partition extending parallel to said top and separating said peripheral skirt into upper and lower sections, such that a substantially cylindrical measuring chamber is defined by said top, said upper section of said skirt and said partition; and wherein at least one of said top and upper section of said peripheral skirt is provided with volume indicators; said partition formed with a weir aperture therein on one side of a diametrical centerline extending across said cap, said weir aperture formed in a portion of said partition lying parallel with said substantially horizontal top, said aperture having a weir edge extending parallel to and laterally spaced from said centerline; said top including at least one dispensing door having a peripheral, arcuate depending flange frictionally engageable over a corresponding arcuate portion of an upper edge of said upper section of said skirt, said depending flange and said upper edge having cooperating means for enabling snap fit engagement therebetween, said dispensing door pivotally secured to said top by a first integral hinge having a hinge axis parallel to said centerline and said weir edge, and wherein a portion of the door opposite said hinge axis lies on the other side of said diametrical centerline.

2. The cap of claim 1 wherein said hinge caps of said at least one door lies on said one side of said diametrical centerline.

3. The cap of claim 1 wherein said hinge caps of said at least one door lies on said other side of said diametrical centerline.

4. The cap of claim 3 wherein said at least one door comprises a first dispensing door and wherein a second dispensing door is secured to said top by a second integral hinge lying on said one side of said centerline.

5. The cap of claim 3 wherein said first integral hinge of said at least one door lies on said centerline and wherein another dispensing door is secured to said top by another integral hinge lying on said one side of said centerline.

6. The cap of claim 4 wherein said volume indicators are provided on said at least one door and comprise level lines extending parallel to said centerline.

7. The cap of claim 5 wherein said volume indicators are provided on said at least one door and comprise level lines extending parallel to said centerline.

8. The cap of claim 1 wherein said cooperating means includes at least one projecting bead on said depending flange and a rim provided with an oppositely projecting bead on said upper edge of said upper section of said skirt.

9. The cap of claim 8 wherein said at least one door and said second dispensing door are substantially identical.

10. The cap of claim 1 wherein said top and said peripheral skirt are of one-piece construction.

11. The cap of claim 4 wherein said top is separable from said skirt.

12. The cap of claim 11 wherein a disc is secured between said top and said skirt, said disc having first and second openings therein, the first opening lying on said one side of said centerline and the second opening lying on the other side of said centerline, said first opening overlying said weir aperture and underlying said second door.

13. The cap of claim 12 wherein said first opening in said disc is fitted with a panel having a plurality of openings formed therein.

14. The cap of claim 12 wherein means are provided on said top, said disc and said upper section of said skirt for permitting said top to be snap-fit onto said disc and said disc to be snap-fit onto said upper skirt section.

15. The cap of claim 4 wherein a panel, integral with said top and said second door, lies under said second door, said panel provided with a plurality of openings.

16. The cap of claim 1 wherein said partition slopes upwardly from said weir edge to an upper edge of said upper skirt section.

17. The cap of claim 1 constructed of transparent plastic material.

18. The cap of claim 11 wherein said top is constructed of transparent plastic material and said skirt is constructed of opaque plastic material.

19. The cap of claim 1 wherein said partition is snap-fit in a groove formed in said skirt.

20. The cap of claim 1 and including means for establishing a substantially airtight seal between said at least one dispensing door and said top when said dispensing door is closed.

21. A measuring/dispensing cap adapted for removable attachment to an open, upper end of a container, the cap comprising first selectively usable means for enabling an accurately determined amount of container contents to be transferred to a measuring chamber within the cap and dispensed form the cap via the measuring chamber, and, for use in an alternative mode of operation, second selectively usable means for enabling substantially unrestricted pouring of container contents through the cap.

22. A measuring/dispensing cap adapted for attachment to an open, upper end of a container, the cap comprising:

a substantially horizontal top and a peripheral skirt extending downwardly from said top, said peripheral skirt including means for removeably attaching the cap to the container; a partition separating said peripheral skirt into upper and lower sections, the upper section comprising a measuring chamber defined by said top, said upper section of said skirt and said partition; and wherein at least one of said top and upper section of said peripheral skirt is provided with volume indicators; said partition formed with a weir aperture on one side of a diametrical centerline extending across said cap, said aperture defined in part by a weir edge extending parallel to and spaced from said centerline, with said partition sloping upwardly from said weir edge to an upper edge of said upper skirt section; and further wherein said top is pivotally secured to said peripheral skirt by an integral hinge to thereby provide a dispensing door having a hinge axis on said one side of and parallel to said diametrical centerline.

23. The cap of claim 22 and including means for establishing a substantially airtight seal between said dispensing door and peripheral skirt when said dispensing door is closed.

* * * * *